D. R. BRYAN, DEC'D.
F. J. BRYAN, ADMINISTRATOR.
APPARATUS FOR SORTING HETEROGENEOUS MATERIAL.
APPLICATION FILED MAR. 31, 1917.

Reissued July 20, 1920.

14,917.

2 SHEETS—SHEET 1.

Inventor
Daniel R. Bryan,
By his Attorney
Geo. A. Byrne

D. R. BRYAN, DEC'D.
F. J. BRYAN, ADMINISTRATOR.
APPARATUS FOR SORTING HETEROGENEOUS MATERIAL.
APPLICATION FILED MAR. 31, 1917.

Reissued July 20, 1920. 14,917.

2 SHEETS—SHEET 2.

Inventor
Daniel R. Bryan,
By his Attorney
Geo. A. Byrne

UNITED STATES PATENT OFFICE.

DANIEL R. BRYAN, OF CHATHAM, NEW JERSEY; FRANCIS J. BRYAN ADMINISTRATOR OF SAID DANIEL R. BRYAN, DECEASED.

APPARATUS FOR SORTING HETEROGENEOUS MATERIAL.

14,917. Specification of Reissued Letters Patent. Reissued July 20, 1920.

Original No. 1,139,484, dated May 18, 1915, Serial No. 837,851, filed May 11, 1914. Application for reissue filed March 31, 1917. Serial No. 158,972.

*To all whom it may concern:*

Be it known that I, DANIEL R. BRYAN, a citizen of the United States, residing at Chatham, New Jersey, have invented certain new and useful Improvements in Apparatus for Sorting Heterogeneous Material, of which the following is a specification.

The general object of this invention is to refine the construction of an apparatus for sorting heterogeneous material, such as that which makes up the refuse of cities and consisting mainly of ashes, cinders, paper, rags, glass articles, metallic substances, etc., and especially that type of apparatus as shown in U. S. Reissue Patent No. 14,266, dated March 6th, 1917. In that apparatus it has been proposed to employ rotary screen members having graduated openings and a stationary inclined chute to receive the mass of material after the same has been operated upon by the screens. I have now found that the efficiency of the structure forming the subject matter of that patent may in no wise be departed from by the substitution of a reciprocating screen and a vibrating table arranged so as to receive the material after it has been operated upon by the screens. In fact, by the substitution of these new elements, the apparatus is rendered capable of operating extremely efficiently on certain grades of material and at the same time the cost of manufacture is greatly reduced.

Figure 1:
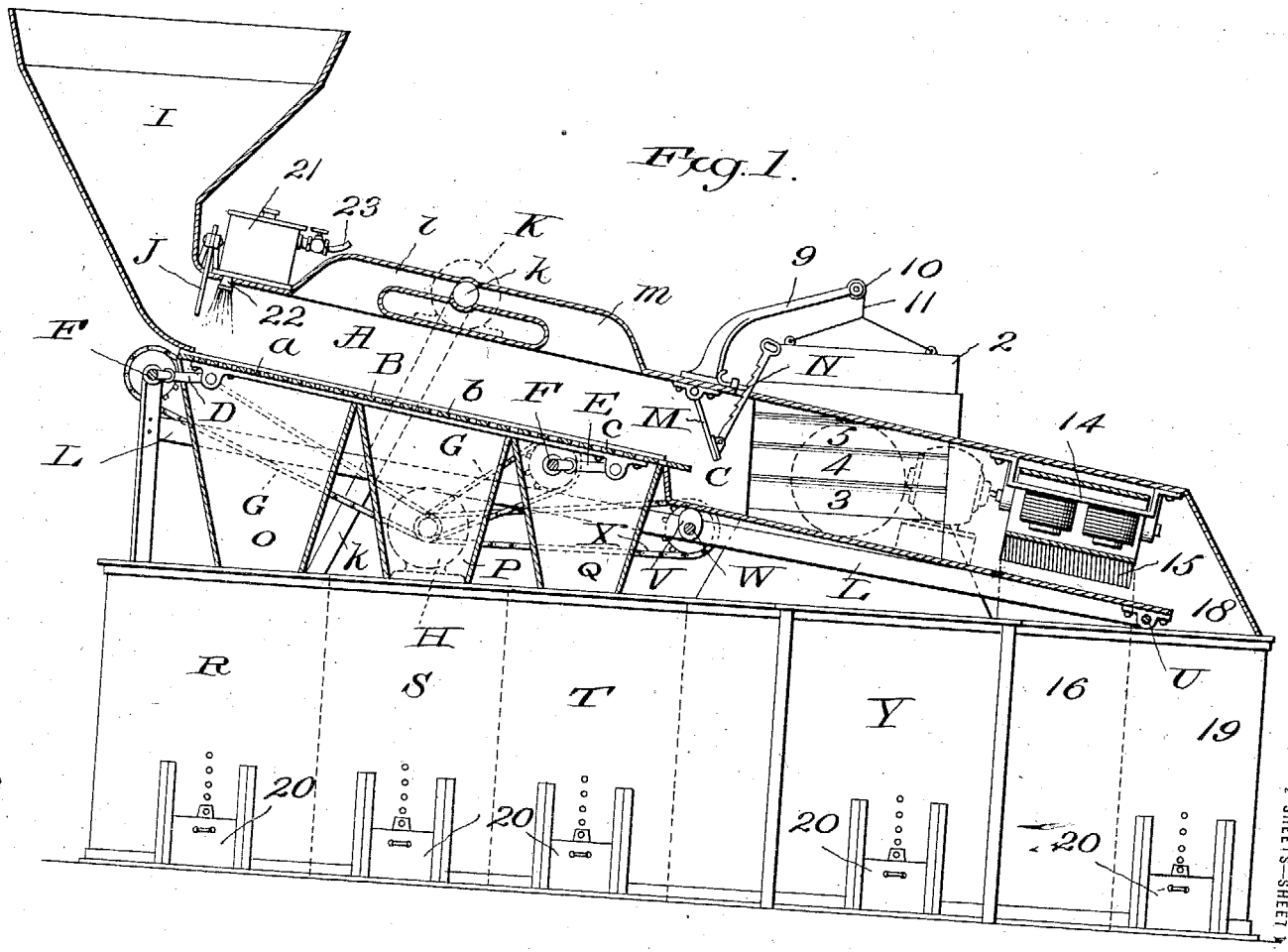
Figure 2:
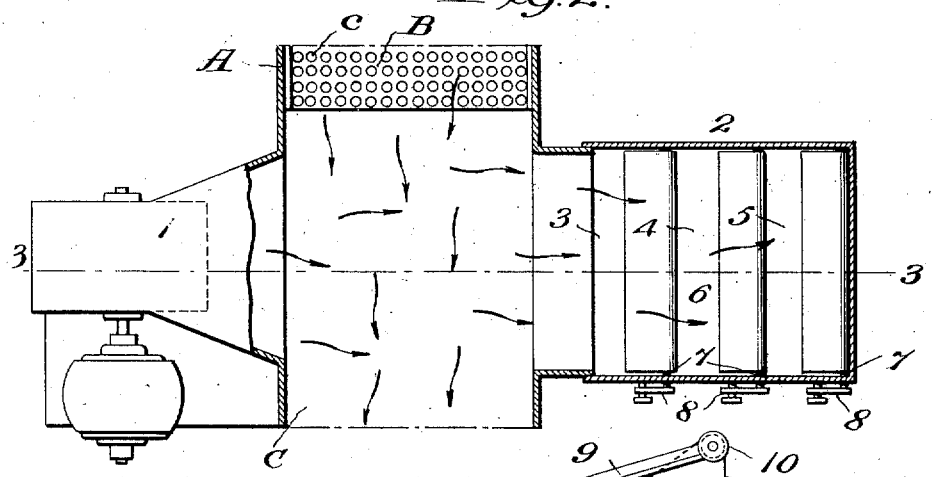
Figure 3:
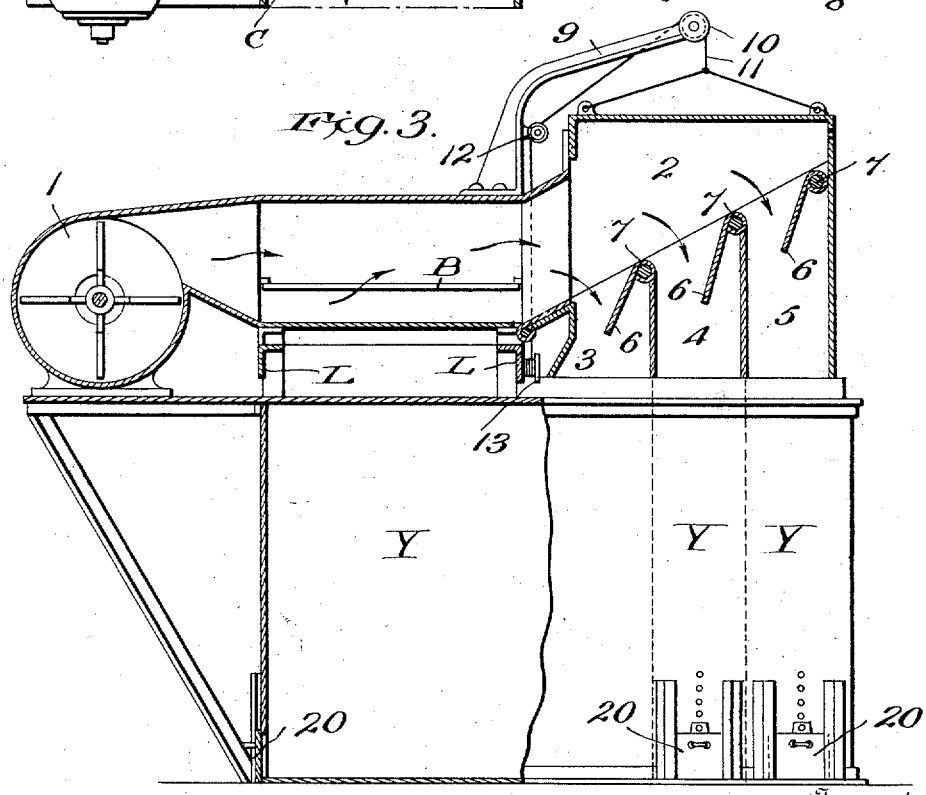

Other objects will appear and be better understood from that embodiment of my invention, of which the following is a specification, reference being had to the accompanying drawings forming a part hereof, in which, Figure 1 shows a longitudinal vertical section with parts in elevation. Fig. 2 shows a horizontal sectional view of that portion of the apparatus in which is located the segregating mechanism, and Fig. 3 is a cross sectional view taken on the line 3—3 of Fig. 2 with parts shown in elevation.

In the drawings A designates a casing, B a reciprocating screen provided with a series of holes of relatively different sizes, and C a chute preferably rectangular in cross section and to which the material passes after being acted upon by the screen.

The screen may be mounted for reciprocation in the bottom of the casing in any suitable manner. As here shown, it is provided at each end portion with crank rods D and E, which are connected to the crank shafts F.

Through chain and sprocket connections G with an electric motor H, the crank shafts are rotated.

The screen is preferably formed of one continuous sheet of metal and is preferably divided into three sections, namely *a b c*, in which the relatively different sized holes are located.

The casing is preferably provided at its upper end with a hopper I into which the material to be sorted is dumped and which delivers the same to the screen as shown.

An adjustable gate or door J is provided within the lower end of the hopper for the purpose of regulating the flow of material to the screen when desired.

In the upper end of the chute is preferably arranged a means for removing the clouds of dust and fine particles produced by the screening operation. As shown here, I have employed practically the same means as disclosed in my earlier patent—namely, an electric fan K which produces a current of air in a conduit *k* which acts by inspiration, through orifices *l* and *m* over the screen, to draw the dust-laden air from within the chute into the conduit and carry it away, as to a bin or receptacle hereinafter referred to.

Material passing from the hopper onto the screen is agitated thereby and the screen being provided at its section *a* with small perforations, is partially sifted and such particles as ashes and other fine particles removed therefrom. From the section *a* the material passes to the section *b* where it is again further sifted. The section *b* is provided with larger perforations than the section *a* and such parts of the material as small cinders or other particles may be removed. From the section *b* the material passes to the section *c* where it undergoes further agitation and sifting. The section *c* having larger perforations than the section *b* operates to remove the larger particles from the mass. A suitable frame L is also provided for the purpose of supporting the chute and casing at the proper inclination.

From the screen B the material passes into the chute C, and a swinging door M, adapted to be held in adjustable position by means of a rack and dog N, may be provided for regulating the passage of material to the chute. The sifted material, which is separated by the several sections of the screen, falls into a series of funnels O, P, Q, arranged beneath the screen and is delivered into separate bins or compartments, R, S and T where it may be collected. After the screen has acted upon the material, it is then discharged onto a vibrator which forms the bottom of the lower portion of the chute. The construction of this vibrator is best understood by reference to Fig. 1 wherein its lower end is shown pivotally connected to the frame as at U and its upper end is mounted upon an eccentric V secured to a shaft W.

Through a sprocket and chain connection X with the electric motor H the eccentric is rotated, whereby the operation of the vibrator is effected. By constructing the lower part of the chute as a vibrator admits of this part of the chute performing a two-fold function; namely, as a means for accelerating the movement of the material through the chute after the material has been deposited onto the vibrator as previously described; and also as a means for loosening lumpy material remaining unaffected under the action of the screen, or relatively light material that becomes deposited under the heavy. Thus it will be seen that the action of the vibrator on the material deposited thereon conditions this material to be effectively operated upon by the segregating mechanism shown in detail in Figs. 2 and 3 and which will now be described.

Referring now to Figs. 2 and 3, it will be seen that the segregating mechanism includes a motor-operated fan 1 arranged so as to direct a blast of air transversely of the vibrator. Thus it will be seen that when the material is conditioned by the action of the vibrator as previously described, the air blast generated by the fan will operate to remove the relatively light material from the vibrator and direct the same into another part of the segregating mechanism, to wit:—a casing 2 which will be observed is disposed at right angles to the vibrator and in alinement with the fan 1, and leave the residue of material as a substantially thin layer or stratum whereby it is conditioned to have the metallic particles exposed for removal.

It will be observed that the casing is provided with a series of chutes 3, 4 and 5, opening at one end through the bottom of the casing and arranged one behind the other and viewed from a position looking toward the right in Fig. 3. Thus it will be seen that this disposition of the chute provides that the relatively light mass of heterogeneous material removed from the vibrator by the direction of the fan blast and directed thereby into the casing will be separated according to the specific gravities of its components, that is to say, when the force of the blast is such as will move the relatively heavy components of the mixture to the first compartment 3 on the left in Fig. 3, gravity will operate to move these into the said compartment 3, while the lighter components will move forwardly under the action of the blast until the heavier of these coming into alinement with the second compartment 4 on the right and away from the influence of the blast, will fall by gravity into the said compartment 4. The still lighter components on coming into alinement with the third compartment 5 and out of the influence of the blast will gravitate into this compartment. Manifestly with this arrangement, greater or less number of compartments than shown may be employed as the character of the work demands. With a battery of three compartments as shown or more, any of these may be rendered closed or inoperative by means of a door 6 as shown in Fig. 3. The doors are arranged at the upper ends of the compartments and are pivoted as indicated at 7 and operated from the exterior of the casing by the handles 8.

The relatively light material which is separated from the mass and after passing through the chutes 3, 4 and 5, falls into a series of compartments or bins Y where it may be collected.

As shown in Fig. 3, the mouths of the compartments lie in an inclined plane in order that heterogeneous masses of different conditions, such as relatively wet and dry, may be effectively operated upon, the casing 2 is rendered bodily adjustable in a vertical manner. Any improved means for effecting this adjustment may be employed but for the purpose of illustration, I have shown the casing suspended from a davit 9 mounted on top of the chute C. On the end of the davit 9 is arranged a sheave 10 over which passes a wire cable 11, one end of which is connected to the upper end of the casing, the other end of which after passing around a second sheave 12, mounted on the davit, is brought down to and wrapped around a cleat 13 mounted on the side of the frame L, see Fig. 3, where the end of the cable may be within convenient reach of an operator.

From the point where it is acted upon by the blast of air, the material passes to a point where it is acted upon by an electromagnetic separator 14, the action of which is to separate magnetizable particles, such as iron and the like from the mass. As here shown, I have employed practically the same means for accomplishing this result as that embodied in my earlier patent, whereby magnetizable material is separated from the mass and conveyed through an opening 15 in the side of the chute and delivered into a bin or receptacle 16.

After passing the electro-magnetic separator such parts of the mass as remain and consist mainly of bottles, particles of glass, etc., will be delivered through the end of the chute 18 into a bin or receptacle 19 where it may be collected.

Each of the bins or receptacles is preferably provided with a door 20 through which the contents may, from time to time, be removed.

The usual means employed by me for antiseptically treating the material after it leaves the hopper is shown in Fig. 1 and comprises a tank 21 adapted to deliver a suitable disinfectant to the pipe 22 for spraying the disinfectant over the material as it first enters the casing. A valved-pipe 23 is also provided through which compressed air from a suitable source may be admitted to the tank to force the disinfectant out from the pipe over the material to be sprayed.

As will be understood, the apparatus herein disclosed is operative to subject the heterogeneous material to assorting action while the material is traversing a flow path, the assorting being in approximate correspondence with general characteristic divisions of the material, this action being provided by the use of separating zones located successively in such flow path and individually active to remove material of predetermined characteristics while the material is traversing the zone, one of said zones, intermediate the ends of the flow path being adapted to receive material and provide a stratification of the material within limits to locate the lighter portions of the material in an upper strata, said lighter particles being placed in suspension by a pneumatic blast to carry the particles transversely from such path into a classifying chamber within which the removed particles are automatically classified during travel to deposit receptacles, the chamber being of dimensions to automatically decrease the pressure of the blast, so that the particles are removed under maximum pressure and classified under modified pressure, thereby permitting of classification by specific gravity of the traveling particles.

It is obvious that those skilled in the art may vary the details of construction and arrangement of parts without departing from the spirit of my invention, and, therefore, I do not wish to be limited to such features, except as may be required by the claims.

What I claim is—

1. In an apparatus for sorting heterogeneous material, the combination of a chute, a casing opening into said chute and having a series of compartments, said compartments having a plurality of inlet openings arranged therein at relatively different heights, a fan located diametrically opposite the said openings, arranged for blowing a blast of air transversely of the material as it passes down the chute for separating paper and light particles from the mass and directing them into the said inlet openings, and means for adjusting said casing relatively to said chute.

2. In an apparatus for sorting heterogeneous material, the combination of a chute; a casing opening into said chute and having a plurality of vertically disposed compartments of relatively different heights; independently adjustable doors for said compartments for varying the area of inlet openings thereof; a fan for causing an air blast in the direction of said compartments; and means for adjusting said casing compartments relatively to said chute, substantially as described.

3. In an apparatus for sorting heterogeneous material, the combination of a chute; a casing opening into said chute and having a plurality of vertically disposed compartments of relatively increasing heights from the chute opening; a fan for causing an air blast in the direction of said compartments; and means for adjusting said casing compartments relatively to said chute, substantially as described.

4. In an apparatus for assorting heterogeneous material, the combination of a chute; a casing opening into said chute and having vertically arranged partitions providing compartments of relatively increasing heights from the chute opening; a fan for causing an air blast in the direction of said compartments; and means for adjusting said casing compartments relatively to said chute, substantially as described.

5. In an apparatus for sorting heterogeneous material, the combination of a chute; a vibrator located within the chute; a fan for causing an air blast transversely of the vibrator; a casing opening into the chute and provided with partitions forming compartments of relatively increasing heights from said chute opening; independently adjustable doors for said compartments for varying the area of inlet openings thereof; and means for adjusting said casing compartments relatively to said chute, substantially as described.

6. In combination, a support, means for passing thereover material to be sorted, a casing associated with the support, and having a series of compartments provided with inlet openings and means for subjecting the passing material to a fluid blast directed substantially horizontally and transversely of the line of movement of the material to distribute said material and place the lighter particles in suspension and direct the same toward and into said openings.

7. In combination, an inclined support, means for passing thereover material to be sorted, a casing associated with the support and having a series of compartments provided with inlet openings, and means for subjecting the passing material to a fluid blast directed substantially horizontally and transversely of the line of movement of the material to distribute said material and place the lighter particles in suspension and direct the same toward and into said openings.

8. In combination, an extended supporting and transporting surface arranged to receive mixed material to be sorted, a casing associated with said support, and having a series of compartments provided with inlet openings, and pneumatic means arranged for blowing a blast of air substantially horizontally and transversely of the line of movement of the material on the support to distribute said material and place the lighter particles in suspension and direct the same toward and into said openings, whereby the coarser residue is left as a substantially thin layer or stratum on the support.

9. In combination, a support, means for feeding material longitudinally of said support, a casing associated with the support and having a series of compartments provided with inlet openings, and pneumatic means located substantially opposite said openings arranged for blowing a blast of air transversely of the direction of feed of the material to distribute said material on the support and place the lighter particles in suspension and direct the same toward and into said openings according to their specific gravities.

10. In combination, means for preliminarily sizing material to be sorted, a moving support arranged to receive the material from said means, a casing associated with the support and having a series of compartments provided with inlet openings, and pneumatic means located substantially opposite said openings and arranged for blowing a blast of air transversely of the material on the support to place the lighter particles in suspension and direct the same toward and into said compartments and leave the residue as a substantially thin layer or stratum on the support, whereby the stratum is conditioned to have the metallic particles exposed for removal.

11. In combination, means for feeding mixed material to be sorted, a moving inclined support arranged to receive the material from said means, a casing associated with the support and having a series of compartments provided with inlet openings, pneumatic means located substantially opposite said openings and arranged for blowing a blast of air transversely and horizontally of the material on the support to place the lighter particles in suspension and direct the same toward and into said compartments.

12. In apparatus for sorting heterogeneous material, and wherein the material is subjected to sorting action while traversing a material flow path, a support for the material during travel through such path, means for removing material of predetermined general characteristics from the material traversing the flow path and for classifying the removed material while traveling from such path.

13. In apparatus for sorting heterogeneous material, and wherein the material is subjected to sorting action while traversing a material flow path, a support for the material during travel through such path, means operative intermediate the ends of such flow path for removing material of predetermined general characteristics from the material traversing the flow path and for classifying the removed material while traveling from such path.

14. In apparatus for sorting heterogeneous material, and wherein the material is subjected to sorting action while traversing a material flow path, a support for the material during travel through such path, means for removing material of predetermined general characteristics from the material traversing such path and for classifying the removed material while traveling from such path, said means including an air blast operative in directions transverse to the material flow path and in the direction of classifying action.

15. In apparatus for sorting heterogeneous material, and wherein the material is subjected to sorting action while traversing a material flow path, means for removing material of predetermined general characteristics from the material traversing such path and for classifying the removed material while traveling from the path, said means including a classifying chamber and an air blast delivery on opposite sides of the flow path with the direction of blast transverse to such path, said chamber having dimensions to permit the pressure of the blast to be automatically decreased, whereby the material is removed under maximum pressure and classified under modified pressure.

16. In apparatus for sorting heterogeneous material, and wherein the material is subjected to sorting action while traversing a material flow path, means for removing material of predetermined general characteristics from the material traversing such path and for classifying the removed material while traveling from the path, said means including a classifying chamber and an air-blast delivery on opposite sides of the flow path with the direction of blast transverse to such path, said chamber having dimensions to permit the pressure of the blast to be automatically decreased, and a succession of compartments normally open to said chamber and extending in the direction of material flow into the chamber, whereby the material is removed and delivered to said chamber under maximum pressure and classified in a zone of modified pressure to permit classification by specific gravity of the material.

17. Apparatus of the type claimed in claim 16, characterized in that the compartments open into the classifying chamber from below and have walls extending angularly to the direction of travel of the blast and project into the chamber to different heights therein.

18. Apparatus of the type claimed in claim 16, characterized in that the compartments open into the classifying chamber from below and have walls extending angularly to the direction of travel of the blast and project into the chamber to successively increased heights and in correspondence with the increase in distance from the point of blast delivery.

19. In apparatus for sorting heterogeneous material of varying characteristics, and wherein material is subjected to assorting action while traversing a material flow path and in approximate correspondence with general characteristic divisions of the material, separating zones located successively in such flow path and individually active to remove material of predetermined characteristics therefrom, means whereby the traveling material will be stratified within an intermediate zone with the lighter material in uppermost strata, and an air blast operative in said zone for removing said lighter material transversely from the path and for classifying the removed material while subject to the blast action.

Signed at Newark in the county of Essex and State of New Jersey, this 29th day of March, 1917.

DANIEL R. BRYAN.

Witnesses:
C. G. Thompson,
Geo. A. Byrne.